Feb. 20, 1962    R. C. KESTER    3,022,434
DYNAMOELECTRIC MACHINE BRUSHHOLDER MEANS
Filed March 20, 1959    2 Sheets-Sheet 1

INVENTOR.
Robert C. Kester
BY
John T. Marvin
HIS ATTORNEY

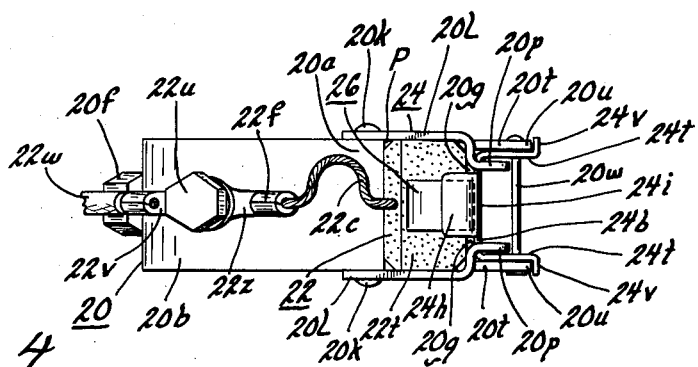
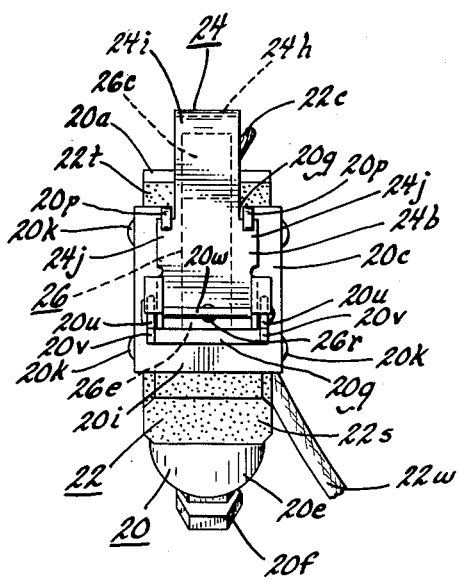

though a brush means can be made readily accessible for replacement whenever the pivotable member is unlatched only adjacent to a free end thereof so as to permit curling up of the spring which uncurls under urging of force as the member is returned into latched position in proper alignment relative to the casing.

United States Patent Office 3,022,434
Patented Feb. 20, 1962

3,022,434
DYNAMOELECTRIC MACHINE BRUSHHOLDER MEANS
Robert C. Kester, Dayton, Ohio, assignor to General Motors Corporation, Detroit, Mich., a corporation of Delaware
Filed Mar. 20, 1959, Ser. No. 800,867
2 Claims. (Cl. 310—245)

This invention relates to dynamoelectric machines and particularly to a brushholder means or brush rigging assembly adapted for use in a dynamoelectric machine.

An object of this invention is to provide a new and improved brushholder structure adapted for convenient access for replacement of brush means and adapted for quick and accurate re-assembly once installation and/or servicing the brush means has been accomplished.

Another object of this invention is to provide a brushholder construction including a casing having a pair of laterally extending projections and integral latching means also projecting laterally therefrom relative to which a spring-mounting plate is movable into latching and unlatching positions so as to locate a spring means in and out of engagement with a brush means which is replaceable though the plate and spring means are maintained in proper alignment at all times relative to a location where the brush means fits.

Another object of this invention is to provide a brushholder construction including a casing and a side plate or covering member pivotable and latchable relative to the casing so as permanently to maintain alignment and to provide a mounting for a constant pressure spring means which is kept from being misplaced and/or lost relative to both inner and outer space adjacent to a dynamoelectric machine and which serves a dual function in both biasing a brush means and resiliently maintaining latched engagement of the side member relative to the casing.

A further object of this invention is to provide a brush rigging assembly including a casing relative to which there is provided a spring-mounting member pivotally secured to the casing adjacent to a commutator of a dynamoelectric machine and adapted to be latched relative to the casing in a manner whereby a constant-pressure spring always remains a part of the assembly free of any danger of being lost, misaligned, bent, and/or damaged though a brush means can be made readily accessible for replacement whenever the pivotable member is unlatched only adjacent to a free end thereof so as to permit curling up of the spring which uncurls under urging of force as the member is returned into latched position in proper alignment relative to the casing.

Another object of this invention is to provide a brush rigging assembly including a base having a body portion and a passage-forming portion relative to which a cover plate is pivotally journaled by means of lateral complementary tab means apertured and/or slotted to permit predetermined movement or displacement between the plate and passage-forming portion so as to permit latching and unlatching of a free end of the plate into and out of engagement relative to locking projection means located on the passage-forming portion at a location having a predetermined spacing away from the tab means and in alignment therewith such that a constant-pressure spring means attached to the cover plate can be moved into and out of operative engagement relative to a brush means adapted to be fitted into place relative to the passage forming portion.

Further objects and advantages of the present invention will be apparent from the drawings wherein preferred embodiments of the present invention will be shown.

In the drawings:
FIGURE 1 is a side view of a brush rigging assembly having a spring-supporting cover member latched relative thereto in accordance with the present invention for a dynamoelectric machine.

FIGURE 3 is an end view of the brush rigging assembly taken in the direction of arrow 3 in FIGURE 1.

FIGURE 4 is a top view of the brush rigging assembly taken in the direction of arrow 4 in FIGURE 1.

Figure 1:
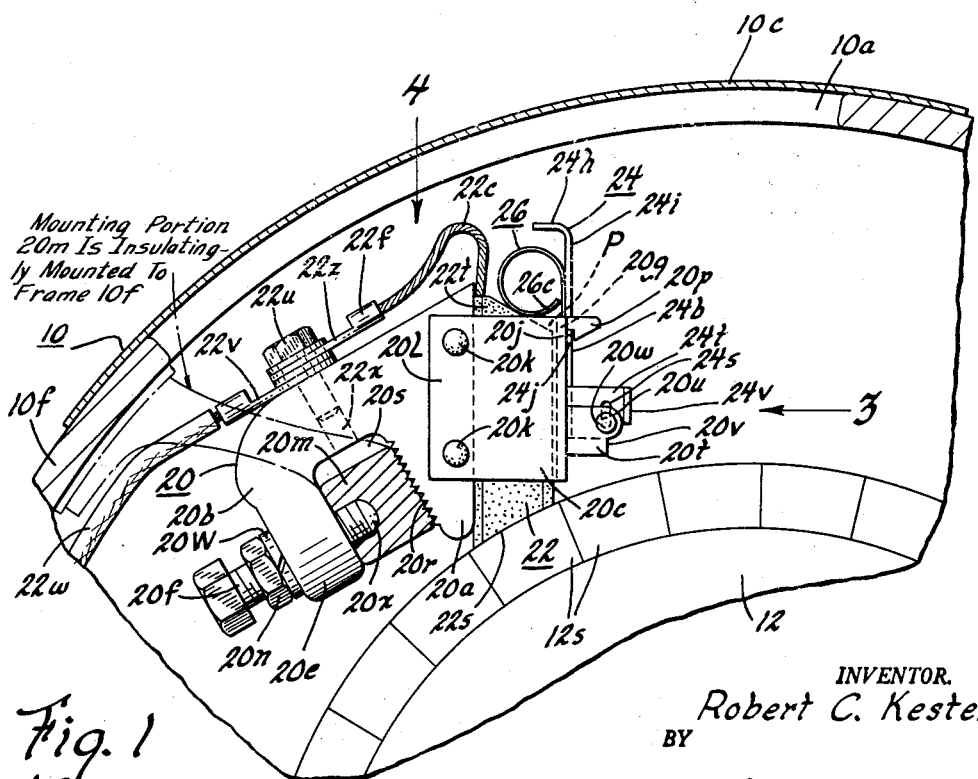

A fragmentary cross-sectioned elevational view of a dynamoelectric machine generally indicated by numeral 10 is shown in FIGURE 1. The dynamoelectric machine includes a housing or frame 10f provided with a laterally extending opening or aperture 10a relative to which there is provided a curved cover 10c which can be secured relative to the frame 10f in any suitable manner. A plurality of head screws, for example, adapted to be fitted around an outer periphery of the cover 10c can hold the cover in position over the aperture 10a. The dynamoelectric machine 10 includes a commutator 12 having a plurality of segments 12s relative to which there is provided a brushholder means or brush rigging assembly generally indicated by numeral 20.

The aperture 10a is sufficiently large in width and length to permit access to the brushholder means 20. Many dynamoelectric machines such as 10 are provided in locations where it is difficult to service brushholder means. Insufficient space or lighting for convenient working will often result in difficulty during installation and/or servicing of brush means relative to a brushholder assembly. Difficulty can be encountered in effecting re-assembly of brushholder parts after a brush means has been replaced. Such difficulty can even include loss of parts of the brushholder assembly. For example, a separable spring means can be used to bias a brush means radially inwardly toward the commutator segment 12s and this spring means can be mounted on a separable clip which can be easily dropped or misplaced in locations where the clip can fall inside the dynamoelectric machine frame 10f and can even cause damage to a component such as the rotor or commutator of the dynamoelectric machine in the event that the clip cannot be retrieved. Often, to prevent such damage, it may be necessary to remove components of the dynamoelectric machine housing including an end frame so as to provide access to the brushholder means and/or to permit retrieving of a part of the brushholder means so as to prevent possible damage to the machine. Removal of parts of a dynamoelectric machine can be costly so far as labor is concerned and also so far as lost time is concerned during which the dynamoelectric machine would be in operation for a useful purpose.

The brushholder means or brush rigging assembly 20 in accordance with the present invention includes new and improved structure adapted for convenient access for replacement of brush means and adapted for quick and accurate re-assembly of parts thereof. The brushholder means 20 includes a base 20a relative to which there is provided a body portion 20b and a passage or conduit forming portion 20c. The base 20a includes ribs or serrations 20r located along one side of a slot 20s that extends laterally into the body portion 20b. The slot 20s is adapted to form a substantially U-shaped or C-shaped clamp structure including the base 20a and body portion 20b. A free end 20e of the body portion 20b has a threaded opening extending transversely therethrough relative to which a cap screw of bolt or fastening means 20f is fitted. A washer 20W and a locknut 20n are provided on the fastening means 20*f* and can be adjusted to secure the fastening means 20*f* in a predetermined position relative to a dynamoelectric machine mounting-portion or bar 20*m*. The mounting portion or bar 20*m* is preferably fastened to any suitable portion of the dynamoelectric machine frame 10*f* and is insulated relative to the frame as outlined in FIGURES 1 and 2. The ribs 20*r* engage one side of the mounting portion 20*m* as an end portion 20*x* of the fastening means 20*f* engages the mounting portion 20*m* and urges the latter tightly into engagement relative to the ribs. The ribs or serrations effect a gripping of the mounting portion 20*m* such that the base 20*a* is held rigidly in position and cannot be displaced due to vibration during operation of the dynamoelectric machine. It is to be understood that a suitable recess can be provided in the mounting portion 20*m* for receiving the end 20*x* of the fastening means 20*f* in a predetermined location. The mounting portion 20*m* can also be a flange or projection formed or cast integrally with the frame 10*f* of the dynamoelectric machine.

In accordance with the present invention, the passage forming portion 20*c* of the brush rigging assembly includes a pair of laterally extending tabs or flanges 20*t* located adjacent to an outer periphery of the commutator segments 12*s* and spaced a predetermined distance therefrom. Each tab 20*t* includes an apertured end portion 20*u* as well as a back stop portion 20*v* located to one side of the apertured end portion 20*u*. Preferably the back stop portion 20*v* is provided intermediate the apertured end portion 20*u* and the radially outer periphery of the commutator segments 12*s*. The rivet or pivot pin 20*w* is secured to the tabs 20*t* as shown in FIGURES 1 through 4 of the drawings. The tabs 20*t* are integral with the passage forming portion 20*c* adjacent to a lower or radially inner end of a gap 20*g* that extends laterally to one side of a passage "P" formed by the passage-forming portion 20*c*. The passage-forming portion 20*c* is substantially U-shaped in cross-section as best seen in FIGURE 4 and includes an intermediate portion 20*i* which interconnects leg portions 20L. Edges of the leg portions 20L remote from the intermediate portion 20*i* are fitted to be adjacent to the base 20*a* of the brushholder means and suitable fastening of these legs 20L such as by rivets 20*k* can be provided. It is to be understood that the legs 20L could also be brazed or welded relative to the base portion 20*a* of the brushholder means.

A carbon brush means generally indicated by numeral 22 is fitted to extend longitudinally into the passage "P" formed by the passage-forming portion 20*c*. It is to be understood that the dimensions of the passage "P" are slightly greater than the external dimensions of the brush means 22 such that the brush means 22 can be movable longitudinally in the passage "P" in a direction substantially transverse to commutator segments 12*s*. The brush means has a curved surface 22*s* adapted to engage the outer annular periphery of the commutator segments 12*s*. The brush means 22 also has a truncated top portion 22*t* and a pigtail or conductor lead 22*c* is joined to the brush means 22 in a suitable manner for establishing electrical connection through a ferrule portion 22*f* of an electrical connector or terminal 22*z*. An insulated wire 22*w* connected to another terminal 22*v* is adapted to establish electrical connection relative to terminal 22*z* by means of a juncture established by a bolt 22*u* having an end in threaded engagement with a tapped aperture 22*x* in the body portion 20*b* adjacent to slot 20*s*. Suitable washers are provided between the terminals 22*v* and 22*z* as well as the bolt 22*u*. Use of the pigtail 22*c* establishes positive electrical connection relative to the brush means 22. It is to be noted, however, that the base 20*a* as well as the passage forming portion 20*c* are preferably formed of metal which could also be used as a conducting path relative to the brush means 22.

Figure 2:
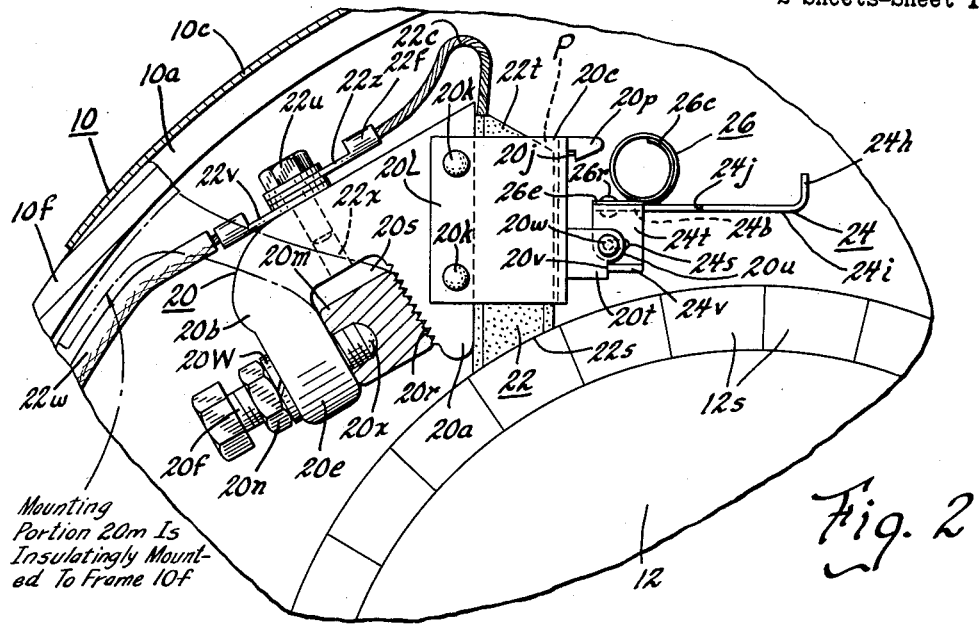
FIGURE 2 is a side view of a brush rigging assembly having a spring-supporting cover member unlatched relative thereto in accordance with the present invention for a dynamoelectric machine.

Further in accordance with the present invention the brushholder means is provided with a side plate or end cover member generally indicated by numeral 24. The cover plate 24 includes a handle portion or hooked end 24*h* which is bent to extend transversely relative to an intermediate portion 24*i* of the cover plate 24 that includes a body portion 24*b* integral with the intermediate portion 24*i*. The body portion 24*b* has a width substantially the same as or slightly greater than width of the gap 20*g* formed above the intermediate portion 20*i* of the bracket having the legs 20L. The body portion 24*b* forms a cover or closure for the gap 20*g*. The body portion 24*b* is integral with a pair of transverse portions 24*t* in each of which there is provided a slot 24*s* which extends substantially parallel to and is laterally spaced from the body portion 24*b*. The rivet or pivot pin means 20*w* is adapted to fit through these slots 24*s* relative to edges of which the cover member 24 is adapted to move a predetermined distance as well as to pivot or tilt relative to the passage forming portion 20*c*. Adjacent to ends of the tabs 24*t* remote from the body portion 24*b* there are provided laterally outwardly projecting abutments 24*v* adapted to engage back stop portion 20*v* as best seen in FIGURE 2.

A pair of locking portions or lateral projections 20*p* are provided integrally with the passage forming portion 20*c* of the brushholder means at a location remote from the outer periphery of the commutator segments 12*s*. These projections 20*p* have a generally J-shaped line to outline due to provision of a slot 20*j* along a lower or radially inner periphery thereof. The slots 20*j* can be best seen in FIGURES 1 and 2. Laterally outwardly extending wings or locking sectors 24*j* integral with the body portion 24*b* of the cover plate 24 are adapted to fit into latching engagement relative to the slots 20*j* of the projections 20*p*.

A constant pressure spring means generally indicated by numeral 26 is secured at one end 26*e* by means of a rivet 26*r* relative to a lower or radially inner section of the body portion 24*b* of side cover or plate member 24. The constant pressure spring means 26 includes a curled portion 26*c* shown in FIGURES 1 and 2. The side cover or plate member 24 is adapted to be latched into engagement relative to the projections 20*p* as shown in FIGURE 1 such that the curled portion 26*c* abuts against the truncated top 22*t* of the brush means 22. The curled portion 26*c* inherently tends to telescope itself toward the fixed end 26*e* of the spring means 26 to a position illustrated in FIGURE 2 which shows the cover plate 24 in an unlatched position. The constant pressure spring means 26 is adapted to provide substantially even and linear force for urging the brush means 22 radially into engagement relative to the commutator segments 12*s*. The spring means 26 per se do not form part of the present invention so far as urging of the brush means 22 is concerned. However the spring means 26 not only serves to bias the brush means 22 but also serves an additional function relative to the brush rigging assembly or brushholder means in accordance with the present invention in that the curled portion 26*c* abuts against the truncated top portion 22*t* of the brush means and thereby biases the cover member 24 radially outwardly relative to the commutator 12 whenever the cover member is in the latched position as shown in FIGURE 1. The hooked end portion 24*h* of the cover member 24 not only provides a convenient handle for gripping the cover member 24 but also serves as a stop for the curled portion 26*c* of the spring means 26. It is to be understood that the width of the gap 20*g* is slightly greater than the width of the spring means 26 so that the curled portion 26*c* can move radially inwardly so as to urge the brush means into engagement relative to the commutator segments 12*s* as the surface 22*s* of the brush means 22 wears away.

Sliding or longitudinal movement of the cover member 24 is possible for a predetermined distance governed by the length of the slot 24s relative to the pivot pin means 20w. This sliding or longitudinal movement of the cover member 24 occurs so as to permit unlatching of the wing sections 24j relative to the slot 20j of projections 20p. In the latching position illustrated by FIGURE 1, the spring means 26 urges the cover member radially outwardly and unlatching can be accomplished only by pressing the cover member radially inwardly parallel to the passage "P" and parallel to the slot 24s for a sufficient distance to clear the wing section 24j from engagement relative to projections 20p. Due to pivoting about the pin 20w, the cover member 24 that carries the spring means 26 is always in proper alignment relative to the gap 20g and passage "P" as well as the brush means 22 adapted to fit in the passage. Due to the fact that the cover member 24 is always in engagement with the pivot pin means 20w, any danger of losing the spring means 26 or cover plate 24 is entirely eliminated. Also, the cover member 24 is maintained in a predetermined location even during unlatching thereof, because the abutment 24v engages the back stop 20v of the tabs 20t. Loss or misplacement of the spring means 26 and cover member 24 is entirely eliminated. The spring means 26 can be fitted in and out of engagement with the brush means 22 which is replaceable relative to passage "P" though the cover plate 24 and spring means 26 are maintained in proper alignment at all times relative to a location where the brush means 22 fits. The side plate or covering member 24 is pivotable and latchable relative to the casing so as permanently to maintain alignment and to provide a mounting for the constant pressure spring means 26 which is kept from being misplaced and/or lost relative to both inner and outer space adjacent to a dynamo-electric machine having a frame 10f. The constant pressure spring means 26 always remains part of the brush rigging assembly free of any danger of being lost, misaligned, bent, and/or damaged though a brush means can be made readily accessable for replacement whenever the pivotable member is unlatched only adjacent to a free end thereof so as to permit curling up of the spring under urging of force as the member 24 is returned into latched position in proper alignment relative to the brush means 22 as shown in FIGURE 1. The spring means 26 can move in space provided by the gap 20g and during effecting latching as shown in the view of FIGURE 1, the spring means 26 can roll up one side of the carbon brush means 22 without the use of any tools and can attain a position whereby constant pressure is exerted longitudinally relative to the brush means 22 and also a biasing force is provided for maintaining latching engagement of the cover member relative to the projection 20t.

While the embodiments of the present invention as herein disclosed constitute a preferred form, it is to be understood that other forms can be adopted.

What is claimed is as follows:

1. A brush rigging assembly, comprising, a dynamo-electric machine frame means and commutator means journalled relative thereto, a brush means adapted to engage an outer peripheral surface of said commutator means, a casing suitably attached to said frame means and including a brush passage therein and an opening along one side thereof, a covering member pivotally attached to said casing at a location adjacent to the opening, latching means carried by said casing and engageable by said covering member, and a spring means attached to said covering member and adapted to move through the opening along one side of the casing, said spring means biasing both said brush means relative to said commutator means and said covering member relative to said latching means when said covering member is in latched position, said casing and covering member having pivotal connection to each other subject to predetermined shifting as permitted by a slot for limited latching and unlatching movement therebetween either prior as well as subsequent to pivoting, said covering member being movable a predetermined distance against bias of said spring means while latching and unlatching is accomplished.

2. Brushholder structure, comprising, a casing as a brush box having a pair of laterally extending projections, latching means carried by said casing, a spring-mounting plate pivotally secured to said projections and adapted to engage said latching means, a spring means attached to one end of said plate and having a curled free end movable relative to said plate, said projections having a stop portion engageable by said plate in unlatched position, said plate having a slotted pair of flange portions adapted to be located adjacent to said projections, and a pivot pin means secured at opposite ends relative to said projections and pivotally and slidably engageable by said slotted pair of flange portions.

References Cited in the file of this patent
UNITED STATES PATENTS 2,683,829    Gerber    July 13, 1954

FOREIGN PATENTS 516,391    Germany    Jan. 22, 1931
756,743    Germany    July 13, 1953